United States Patent Office 2,842,529
Patented July 8, 1958

2,842,529

3,3,3-TRIFLUOROPROPENE POLYMERS AND PREPARATION THEREOF

Archibald N. Bolstad, Maplewood, N. J., assignor, by mesne assignments, to Minnesota Mining and Manufacturing Company, St. Paul, Minn., a corporation of Delaware No Drawing. Application March 28, 1956
Serial No. 574,381

17 Claims. (Cl. 260—87.5)

This invention relates to new and useful fluorine-containing polymers of improved properties and to a method for the preparation thereof. In one aspect this invention relates to high molecular weight fluorine-containing thermoplastics. In another aspect this invention relates to a process for the production of useful high molecular weight fluorine-containing thermoplastics.

Fluorine-containing polymers such as the highly fluorinated thermoplastic polymers (for example, polytrifluorochloroethylene) have been found to possess many useful applications by reason of their relative chemical inertness, high physical strength, and solvent resistance. By virtue of these properties such fluorine-containing polymers can be fabricated into a wide variety of useful articles having improved chemical and physical stability or in the form of protective coatings on the surfaces of a wide variety of useful materials. In connection with these uses, it is also desirable in many instances that these fluorine-containing copolymers be easily vulcanized and processed and when employed as protective coatings that they be easily dissolved in a wide variety of commerically available solvents.

It is an object of this invention to provide new and useful fluorine-containing copolymers having desirable chemical and physical characteristics and to provide a process for the preparation thereof.

Another object is to provide a novel fluorine-containing polymer which can be readily applied as a continuous coating to various hard surfaces.

Another object is to provide a new thermoplastic material which is particularly suitable as a coating on surfaces which are to be exposed to strong and corrosive chemicals.

A further object is to provide a high molecular weight fluorine-containing polymer which is easily vulcanized and which can be molded at relatively low temperatures using conventional molding techniques.

A furthre object is to provide high molecular weight fluorine-containing polymers having the above-mentioned desirable characteristics and which are readily fabricated into a wide variety of useful end products.

A still further object is to provide a process for the manufacture of fluorine-containing polymers having the above-mentioned desirable characteristics and properties.

Various other objects and advantages of the present invention will become apparent to those skilled in the art from the accompanying description and disclosure.

The above objects are accomplished by the process which comprises copolymerizing a trifluoropropene such as 3,3,3-trifluoropropene with a halogenated olefin having at least one halogen other than fluorine and not more than one fluorine atom. The copolymerization is preferably effected in the presence of a free radical forming promoter and may be carired out in an aqueous or non-aqueous medium. The process of the present invention is carried out at a temperature between about —30° C. and about 150° C. The copolymers thereby obtained are valuable macromolecules and are adaptable to a wide variety of commercial uses. They possess good thermal and chemical stability, are selectively soluble in various commercial solvents, and are easily vulcanized or cross-linked and can be molded by conventional techniques to yield a wide variety of useful articles. They also serve as durable, flexible protective coatings on surfaces which are to be subjected to environmental conditions in which they may come into contact with various corrosive substances such as oils, fuels, and strong chemical reagents.

As indicated above, the monomers which are copolymerized with the trifluoropropene are halogenated olefins having ta least one halogen other than fluorine and not more than one fluorine atom. The preferred comonomers are the halogenated ethylenes having at least one chlorine or bromine atom and not more than one fluorine atom. Typical examples of the preferred comonomers to be employed are: vinyl chloride, vinyl bromide, vinylidene bromide, vinylidene chloride, and 1,1-chlorofluoroethylene.

The most useful copolymers of the present invention are produced from monomeric mixtures containing between about 5 mol percent and about 95 mol percent of 3,3,3-trifluoropropene and the remaining major constituent being one of the aforesaid comonomers such as the bromo or chloroethylenes. The criticality of this range will be apparent since it is found that if the 3,3,3-trifluoropropene monomeric content in the mixture undergoing polymerization falls below approximately 5 mol percent, the resulting polymeric product loses its desirable chemical and thermal stability, and a more crystalline, less soluble copolymer is obtained and cannot be processed into useful articles or satisfactory coating compositions. If, on the other hand, the trifluoropropene monomeric content, in the mixture undergoing polymerization rises above approximately 95 mol percent, low conversions are obtained and the resulting polymeric product loses its desirable solubility properties. The preferred copolymers of the present invention are those produced from monomeric mixtures containing between about 15 and about 80 mol percent of 3,3,3-trifluoropropene and the remaining major constituent being one of the aforesaid chlorine- or bromine-containing copolymers. Within this intermediate range thermoplastic copolymers are preferably produced from monomeric mixtures containing between about 30 and about 60 mol percent of 3,3,3-trifluoropropene and the remaining major constituent being one of the aforesaid chlorine- or bromine-containing comonomers.

As indicated above, the fluorine-containing polymers of the present invention are prepared in various comonomer ratios at temperatures between about —30° C. and about 150° C. in the presence of a free radical forming initiator as the polymerization promoter. The preferred temperature is dependent upon the type of polymerization catalyst system employed as will be discussed in more detail hereinafter. The free radical forming initiators or promoters comprise the organic peroxides, inorganic peroxy compounds, and certain azo compounds. The initiator is generally employed in an amount between about 0.001 and about 5 parts by weight per 100 parts of total monomers present, and preferably are employed in an amount of between about 0.1 and about 1.0 part by weight. The polymerization catalyst systems may be aqueous or non-aqueous and include the aqueous suspension and aqueous emulsion type systems, and the mass and solution systems, the aqueous systems being preferred. The copolymerization reaction also may be initiated or catalyzed by actinic or ultraviolet radiation or by ionic type promoters without departing from the scope of the present invention.

The aqueous polymerization systems contain a peroxy compound as the polymerization initiator. Emulsifiers, activators, accelerators, buffers and basic materials also may be included as ingredients of the aqueous systems.

The inorganic peroxy compounds employed as the initiator in aqueous polymerization systems are preferably the water soluble inorganic peroxides such as the perborates, persulfates, perphosphates, percarbonates, barium peroxide, zinc peroxide and hydrogen peroxide. Particularly effective inorganic peroxy compounds are the water soluble salts of the peracids such as the sodium, potassium, calcium, barium and ammonium salts of the persulfuric and perphosphoric acids such as potassium persulfate, ammonium persulfate, and sodium perphosphate.

Organic peroxides also may be employed as the initiator in aqueous systems and are typically exemplified by cumene hydroperoxide, diisopropyl benzene hydroperoxide, triisopropyl benzene hydroperoxide, tertiary-butyl hydroperoxide, tertiary-butyl perbenzoate and methyl cyclohexane hydroperoxide.

Activators which are often used in conjunction with the peroxy compound comprise sodium bisulfite, sodium metabisulfite, sodium thiosulfate, sodium hydrosulfate, p-toluene sulfinic acid, a reducing sugar such as dextrose and levulose and, in general, any water soluble reducing agent. Such activators generally are employed in an amount between about 0.2 and about 0.8 part by weight per 100 parts of total monomers present.

Accelerators which are often employed in the aqueous polymerization systems comprise water soluble variable valence metal salts of sulfates, nitrates, phosphates and chlorides such as cuprous sulfate, ferrous sulfate and silver nitrate. Such accelerators are generally employed in an amount between about 0.01 and about 1.0 part per 100 parts of total monomers present and preferably in an amount between about 0.05 and 0 5 part by weight.

In some instances, it is desirable to employ an emulsifying agent in one of the aforesaid aqueous systems. This emulsifying agent is present either in the form of a metal salt derivative such as the potassium and sodium salt derivatives, derived from aliphatic hydrocarbon carboxylic acids having from 14 to 20 carbon atoms per molecule, or in the form of a halogenated organic acid or salts thereof, having from about 6 to 20 carbon atoms per molecule. Typical examples of the hydrocarbon type emulsifiers are potassium stearate and potassium oleate, and mixtures thereof.

Typical examples of the halogenated organic acids or salts thereof, serving as emulsifying agents in the above-mentioned aqueous recipes are polyfluorocarboxylic acids (e. g. perfluorooctanoic acid) and perfluorochlorocarboxylic acids and their salt derivatives. Among the polyfluorocarboxylic acids and derivatives which may be employed are those disclosed in U. S. Patent No. 2,559,752 as being effective dispersing agents in polymerization reactions.

The preferred perfluorochlorocarboxylic acids and derivatives thereof which are used as emulsifiers are those of the perfluorochloro acids obtained upon hydrolysis of trifluorochloroethylene-sulfuryl chloride telomers in fuming sulfuric acid at a temperature between about 140° C. and about 210° C. The telomers are prepared by interacting trifluorochloroethylene and sulfuryl chloride in the presence of a promoter such as benzoyl peroxide at a temperature of about 95° C. Such perfluorochloro acids have the successively recurring unit,

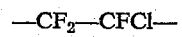

a chlorine-containing end group, and an even number of carbon atoms which is preferably between about 6 and about 14 carbon atoms. Typical examples of such emulsifiers are the potassium, sodium and ammonium salts of 3,5,7,8-tetrachloroundecafluorooctanoic acid and 3,5,6-trichlorooctafluorohexanoic acid. The above-mentioned emulsifiers are generally employed in a quantity between about 0.2 and about 10 parts by weight per 100 parts of total monomers present and preferably between about 0.5 and 5.0 parts by weight are used.

Buffering agents may be used to maintain appropriate pH conditions during the polymerization reaction. Typical examples of suitable buffers are disodium hydrogen phosphate, and sodium metaborate. The buffers are generally employed in an amount between about 1.0 and about 4.0 parts by weight per 100 parts water.

As indicated above, the polymerization process of this invention also may be effected in a non-aqueous mass or bulk polymerization system comprising a free radical-forming promoter such as the organic peroxides and azo compounds. The organic peroxides which may be used include the aliphatic and aromatic peroxy compounds as well as the fluorine and chlorine substituted organic peroxides. Exemplary of suitable aliphatic peroxides are diacetyl peroxide, lauroyl peroxide, tertiary-butyl peroxide, caprylyl peroxide, trichloroacetyl peroxide, perfluoropropionyl peroxide, 3-carboxy propionyl peroxide, 3,4-dibromobutyryl peroxide, trifluoroacetyl peroxide, difluoroacetyl peroxide and perfluorononanoyl peroxide. Exemplary of suitable aromatic peroxides are benzoyl peroxide, p-nitrobenzyl peroxide and 2,4-dichlorobenzoyl peroxide. Exemplary of the azo compounds which may be employed are 2,2'-azo-bis-isobutyronitrile, 2,2'-azo-bis-2,4-dimethylvaleronitrile and 2,2'-azo-bis-2,3,3-trimethylbutyronitrile.

As previously stated, the copolymerization reaction is carried out, in general, at a temperature between about −30° C. and about 150° C. When the polymerization is carried out employing an aqueous recipe, temperatures between about 5° C. and about 100° C. are preferred with a temperature between about 10° C. and about 80° C. being particularly preferred.

The preferred temperature employed to effect polymerization in a mass or bulk system is dependent upon the type catalyst employed. For example, the halogenated peroxides such as trichoroacetyl peroxide, perfluoropropionyl peroxide, and 2,4-dichlorobenzoyl peroxide and azo compounds are preferably employed at a temperature between about −30° C. and about 65° C. The ionic promotors, and the non-halogenated peroxy compounds such as acetyl peroxide, benzoyl peroxide and tertiary-butyl peroxide, are preferably employed at a temperature between about 30° C. and about 150° C.

The polymerization process of the present invention also may be effected in the presence of an organic solvent instead of or in addition to water. Examples of solvents of this kind are fluorochlorocarbon solvents such as fluorotrichloromethane (Freon-11) and the sulfuryl chloride telomers of trifluorochloroethylene. Such telomers contain the successively recurring unit, —CF$_2$—CFCl, chlorine end groups, and an even number of carbon atoms which is preferably between 4 and 14.

The polymerization reactions described herein to produce polymeric materials comprising 3,3,3-tetrafluoropropene are conveniently carried out under autogenous pressure. In general these pressures do not rise above approximately 200 atmospheres. Superimposed pressures up to about 500 atmospheres or higher also may be employed and are attained by charging the polymerization zone with an inert gas such as nitrogen, to obtain the desired elevated pressure. Generally speaking, the polymerization reactions of the present invention are conducted for a reaction time which may vary between about 1 and about 100 hours, but usually good yields of polymer product are obtained in less than about 72 hours. The polymerization reaction can be carried out in a batchwise or continuous manner, as desired.

Plasticizers and finely divided solids which serve as fillers can be included in the polymerization mixture and the polymerization can be carried out in their presence. Examples of suitable fillers include pigments such as titanium oxide, metals such as copper and iron powder and other finely divided materials such as mica and asbestos. These and similar materials can also be added to the preformed polymers.

The 3,3,3-tetrafluoropropene polymers of the present invention are particularly suitable and useful as durable, flexible coatings for application to metal or fabric surfaces. The copolymers are dissolved in a suitable solvent and applied to the surfaces by spraying, brushing, or other such conventional coating techniques. Particularly useful solvents for this purpose comprise the relatively low molecular weight and volatile aliphatic carboxylic acid esters such as methyl acetate, ethyl acetate, and butyl acetate. In this respect it should be noted that it is often desirable to reduce the molecular weight of the finished polymers of the present invention in order to obtain greater solubility in organic solvents. The polymerization reactions which are carried out in the presence of the polymerization promoters of the present invention normally tend to form very high molecular weight polymeric products, that is, polymers having a molecular weight of at least 50,000. A reduction of the strength of the recipe or polymerization promoter merely slows the rate of reaction without appreciably affecting the molecular weight of the finished copolymer. It has been found, however, that the addition of various polymerization modifiers appreciably reduces the molecular weight of the copolymer products and increases their solubility without affecting unduly the over-all yield. Suitable polymerization modifiers include chloroform, 1,1,2-trichlorotrifluoroethane (Freon 113), carbon tetrachloride, bromotrichloromethane, trichloroacetyl chloride and dodecyl mercaptan. These polymerization modifiers are preferably added in amounts between about 1 and about 10 parts by weight per 100 parts of total monomer or monomers charged to the polymerization zone.

The following examples are offered as a better understanding of the present invention and are not to be construed as unnecessarily limiting thereto. The monomer, 3,3,3-trifluoropropene ($CF_3CH=CH_2$), has a boiling point of $-18°$ C. to $-16°$ C. and is prepared as described by A. L. Henne et al., Journal of the American Chemical Society, volume 72, page 3369 (1950).

Example 1

This example illustrates the copolymerization of 3,3,3-trifluoropropene with 1,1-chlorofluoroethylene.

A heavy walled glass polymerization tube of about 20 ml. capacity was flushed with nitrogen and then charged with 7.5 ml. of deionized water and 2 ml. of a 5% aqueous solution of ammonium persulfate. The contents of the tube were then frozen, and the tube was then charged with 2 ml. of a 2.5% aqueous solution of sodium metabisulfite. The contents of the tube were next refrozen in liquid nitrogen and the tube was then charged with 1 ml. of a 0.75% aqueous solution of ferrous sulfate heptahydrate ($FeSo_4 \cdot 7H_2O$). The contents of the tube were then refrozen in liquid nitrogen.

The tube was then connected to a gas-transfer system and evacuated at liquid nitrogen temperature. To the frozen contents of the tube were added, by distillation, 2.72 grams of 3,3,3-trifluoropropene and 2.28 grams of 1,1-chlorofluoroethylene, which comprised a 50/50 molar ratio.

The polymerization tube was then sealed and rotated end-over-end in a temperature-regulated water bath at 20° C. for a period of 78 hours. At the end of this time, the contents of the tube were coagulated by freezing at Dry Ice temperature. The coagulated product was then removed from the tube, washed with hot water and then dried to constant weight in vacuo at 35° C. A resinous tough thermoplastic copolymeric product was obtained, which was found, upon analysis, to comprise approximately 40 mole percent of combined 3,3,3-trifluoropropene, the 1,1-chlorofluoroethylene being present in an amount of approximately 60 mole percent. The product was obtained in a 26 percent conversion based on total monomers charged to the reaction zone.

Example 2

This example illustrates the copolymerization of 3,3,3-trifluoropropene with bromoethylene.

Employing the procedure set forth in Example 1 and the same aqueous polymerization system, the tube was charged with 2.37 grams of 3,3,3-trifluoropropene and 2.63 grams of bromoethylene to make up a total monomer charge containing 50 mol percent of each monomer. The polymerization reaction was carried out under autogenous conditions of pressure at a temperature of 20° C. for 78 hours. The polymeric latex thereby obtained was coagulated by freezing at Dry Ice temperature and the product was worked up in the same manner as described in Example 1 above. A resinous thermoplastic copolymeric product was obtained, which upon analysis was found to comprise approximately 12 mol percent of combined 3,3,3-trifluoropropene, the bromoethylene being present in an amount of approximately 88 mol percent, and is particularly useful as a flame-proofing agent for fabrics.

Example 3

This example illustrates the copolymerization of 3,3,3-trifluoropropene with vinyl chloride.

Employing the procedure set forth in Example 1 and the same aqueous polymerization system, the tube was charged with 3.04 grams of 3,3,3-trifluoropropene and 1.96 grams of vinyl chloride to make up a total monomer charge containing 50 mol percent of each monomer. The polymerization reaction was carried out under autogenous conditions of pressure at a temperature of 20° C. for 41 hours. The polymeric latex thereby obtained was coagulated by freezing at Dry Ice temperature and the product was worked up in the same manner as described in Example 1 above. A resinous thermoplastic copolymeric product was obtained, which upon analysis was found to comprise approximately 29 mol percent of combined 3,3,3-trifluoropropene, the vinyl chloride being present in an amount of approximately 71 mol percent. The product was obtained in a 56 percent conversion based on total monomers charged to the reaction zone.

Example 4

This example illustrates the copolymerization of 3,3,3-trifluoropropene with vinylidene chloride.

Employing the procedure set forth in Example 1 and the same aqueous polymerization system, the tube was charged with 2.49 grams of 3,3,3-trifluoropropene and 2.51 grams of vinylidene chloride to make up a total monomer charge containing 50 mol percent of each monomer. The polymerization reaction was carried out under autogenous conditions of pressure at a temperature of 20° C. for 41 hours. The polymeric latex thereby obtained was coagulated by freezing at Dry Ice temperature and the product was worked up in the same manner as described in Example 1 above. A resinous thermoplastic copolymeric product was obtained, which upon analysis was found to comprise approximately 5 mol percent of combined 3,3,3-trifluoropropene, the vinylidene chloride being present in an amount of approximately 95 mol percent. The product was obtained in a 32 percent conversion based on the total monomers charged to the reaction zone.

Example 5

This example further illustrates the copolymerization of 3,3,3-trifluoropropene with vinylidene chloride.

Employing the procedure set forth in Example 1 above and the same aqueous polymerization system, the tube is charged with 3.75 grams of 3,3,3-trifluoropropene and 1.25 grams of vinylidene chloride to make up a total monomer charge containing 75 mol percent of 3,3,3-trifluoropropene and 25 mol percent of vinylidene chloride. The polymerization reaction is carried out as described in Example 1 above at a temperature of 20° C. for a period of 78 hours under autogenous conditions of pressure, and following the same procedure for isolation of the polymeric product thereby obtained. A solid copolymeric product containing approximately 20 mol percent of 3,3,3-trifluoropropene, the remaining major consistent being vinylidene chloride is obtained in satisfactory yield.

*Example 6*

This example further illustrates the copolymerization of 3,3,3-trifluoropropene with 1,1-chlorofluoroethylene.

A heavy walled glass polymerization tube of about 20 ml. capacity is flushed with nitrogen and is then charged with 5 ml. of 0.75 percent by weight aqueous solution of the potassium salt of the $C_8$-acid derived from the $C_8$-sulfuryl chloride telomer of trifluorochloroethylene, namely, potassium 3,5,7,8-tetrachloroperfluorooctanoate, the pH of this solution having been adjusted to 12 by the addition thereto of an aqueous potassium hydroxide solution. The stoppered tube is then placed in a liquid nitrogen freezing bath. After the contents of the tube are frozen solid, the tube is charged with 1 ml. of a 2 percent by weight aqueous solution of sodium metabisulfite. The contents are refrozen and the tube is further charged with 4 ml. of a 1.25 percent by weight aqueous solution of potassium persulfate. The contents of the tube are then refrozen and the tube is connected to a gas-transfer system and evacuated at liquid nitrogen temperature. To the frozen contents of the tube are added by distillation 1.35 grams of 3,3,3-trifluoropropene and 3.65 grams of 1,1-chlorofluoroethylene which comprises a monomeric mixture containing about 25 mol percent of the propene and about 75 mol percent of the ethylene.

The polymerization tube is then sealed and rotated end-over-end in a temperature regulated water bath at about 50° C. The polymerization is conducted under autogenous pressure at 50° C. for a period of about 24 hours. The polymer latex thus obtained is coagulated by freezing at liquid nitrogen temperature. The coagulated product is collected, washed with hot water to remove residual salts and dried to constant weight in vacuo at 35° C. A high molecular weight solid copolymeric product is obtained in good yield.

As previously indicated, the polymers of the present invention possess highly desirable physical and chemical properties which make them useful for fabrication of a wide variety of articles for application to various surfaces as protective coatings. In such uses the raw copolymers such as those produced in accordance with the procedures set forth in the aforementioned examples can be extruded or pressed into sheets at temperatures between about 200° F. and about 300° F. and at a pressure between about 5,000 and about 20,000 pounds per square inch for a period of about 2 to about 10 minutes. Thereafter various articles can be molded from preforms cut from sheets or extruded thereof in the form of gaskets, grommets, and diaphragms.

When employed as protective coatings in any of the surfaces previously described, the raw copolymeric composition is dissolved in any of the aforementioned solvents such as ethyl acetate and is applied to the desired surfaces employing such apparatus as a knife spreader or a doctor blade or a reverse-roll coater. The solvent, after the copolymeric coating composition has been applied to the surface, is permitted to evaporate. This also may be accomplished in the presence of elevated temperatures. In many applications it is desirable to include in the copolymeric coating composition various vulcanizing or cross-linking agents. In this respect it is pointed out that the copolymers of this invention possess the added advantage in that they are capable of being readily cross-linked or vulcanized by reaction with poly-functional compounds such as poly-amines. Thus, when the copolymers of this invention are treated with hexamethylene diamine, for example, at an elevated temperature such as 150° C., the copolymers are converted to valuable thermosetting resins. Thus, when a cross-linking agent is included in the copolymeric coating composition, supplemental heat treatment of the coating is required either during the solvent removal step or thereafter. After the solvent has been completely evaporated and the vulcanizing step, if included, has been completed, the coated surface is ready for use. In this respect it should be noted that the copolymeric coating composition may be applied to the surface either as a single coating or, if so desired, the protective coating may be built up by the application of several layers, each layer being permitted to harden by solvent evaporation before the next layer is applied. Other uses for the copolymeric compositions of the present invention reside in the fabrication of laminates, films, fibres and tubing.

Various alterations and modifications of the polymerization system and reaction conditions employed and in the novel compositions of this invention may become apparent to those skilled in the art without departing from the scope of this invention.

I claim:

1. A copolymer of 3,3,3-trifluoropropene and a halogenated monoolefin having at least one halogen other than fluorine and not more than one fluorine atom.

2. A copolymer of 3,3,3-trifluoropropene and a halogenated ethylene having at least one halogen other than fluorine and not more than one fluorine atom.

3. A copolymer of 3,3,3-trifluoropropene and a halogenated ethylene containing at least one chlorine atom and not more than one fluorine atom.

4. A copolymer of 3,3,3-trifluoropropene and 1,1-chlorofluoroethylene.

5. A copolymer of 3,3,3-trifluoropropene and vinyl chloride.

6. A copolymer of 3,3,3-trifluoropropene and vinylidene chloride.

7. A copolymer of 3,3,3-trifluoropropene and a halogenated ethylene having at least one bromine atom and not more than one fluorine atom.

8. A copolymer of 3,3,3-trifluoropropene and vinyl bromide.

9. A process for preparing a copolymer which comprises copolymerizing 3,3,3-trifluoropropene with a halogenated monoolefin having at least one halogen other than fluorine and not more than one fluorine atom.

10. A process for preparing a copolymer which comprises copolymerizing 3,3,3-trifluoropropene with a halogenated ethylene having at least one halogen other than fluorine and not more than one fluorine atom at a temperature between about —30° C. and about 150° C.

11. The process for preparing a copolymer which comprises copolymerizing 3,3,3-trifluoropropene with a halogenated ethylene containing at least one chlorine atom and not more than one fluorine atom at a temperature between about —30° C. and about 150° C.

12. A process for preparing a copolymer which comprises copolymerizing 3,3,3-trifluoropropene with 1,1-chlorofluoroethylene at a temperature between about 5° C. and about 100° C.

13. A process for preparing a copolymer which comprises copolymerizing 3,3,3-trifluoropropene with vinyl chloride at a temperature between about 5° C. and about 100° C.

14. A process for preparing a copolymer which comprises copolymerizing 3,3,3-trifluoropropene with vinylidene chloride at a temperature between about 5° C. and about 100° C.

15. A process for preparing a copolymer which comprises copolymerizing 3,3,3-trifluoropropene with a halogenated ethylene having at least one bromine atom and not more than one fluorine atom at a temperature between about −30° C. and about 150° C.

16. A process for preparing a copolymer which comprises copolymerizing 3,3,3-trifluoropropene with vinyl bromide at a temperature between about 5° C. and about 100° C.

17. A thermoplastic copolymer of 3,3,3-trifluoropropene and 1,1-chlorofluoroethylene, said copolymer containing between about 5 mol percent and about 40 mol percent of said 3,3,3-trifluoropropene.

References Cited in the file of this patent

UNITED STATES PATENTS

| | | |
|---|---|---|
| 2,484,530 | Schroeder | Oct. 11, 1949 |
| 2,626,252 | Tawney | Jan. 20, 1953 |

UNITED STATES PATENT OFFICE

CERTIFICATE OF CORRECTION

Patent No. 2,842,529                                                 July 8, 1958

Archibald N. Bolstad

It is hereby certified that error appears in the printed specification of the above numbered patent requiring correction and that the said Letters Patent should read as corrected below.

Column 1, line 52, for "furthre" read -- further --; column 3, line 38, for "0 5" read -- 0.5 --; column 4, line 40, for "trichoroacetyl" read -- trichloroacetyl --; column 8, line 62, for "coploymer" read -- copolymer- Signed and sealed this 18th day of November 1958.

(SEAL)
Attest:

KARL H. AXLINE
Attesting Officer

ROBERT C. WATSON
Commissioner of Patents